(12) United States Patent
Moesslein et al.

(10) Patent No.: US 12,187,066 B2
(45) Date of Patent: Jan. 7, 2025

(54) ARTICLE COMPRISING FLUORESCENCE MARKER PARTICLES AND A METHOD OF IDENTIFYING THE SAME

(71) Applicant: Polysecure GmbH, Freiburg (DE)

(72) Inventors: Jochen Moesslein, Freiburg (DE); Jürgen Heinrich, Freiburg (DE); Philip Katus, Freiburg (DE); Daniel Kirchenbauer, Freiburg (DE)

(73) Assignee: Polysecure GmbH, Freiburg (DE)

( * ) Notice: Subject to any disclaimer, the term of this patent is extended or adjusted under 35 U.S.C. 154(b) by 362 days.

(21) Appl. No.: 17/635,059

(22) PCT Filed: Jul. 16, 2020

(86) PCT No.: PCT/DE2020/100626
§ 371 (c)(1),
(2) Date: Feb. 14, 2022

(87) PCT Pub. No.: WO2021/027989
PCT Pub. Date: Feb. 18, 2021

(65) Prior Publication Data
US 2022/0291127 A1 Sep. 15, 2022

(30) Foreign Application Priority Data
Aug. 15, 2019 (DE) .......................... 102019122010.6

(51) Int. Cl.
*G01N 21/64* (2006.01)
*B42D 25/305* (2014.01)
(Continued)

(52) U.S. Cl.
CPC ......... *B42D 25/382* (2014.10); *B42D 25/305* (2014.10); *B42D 25/351* (2014.10);
(Continued)

(58) Field of Classification Search
CPC ......... G01N 21/643; G01N 2021/6439; G01N 21/64
(Continued)

(56) References Cited

U.S. PATENT DOCUMENTS 11,148,447 B2 10/2021 Kecht et al.
11,235,354 B2 2/2022 Moesslein et al.
(Continued)

FOREIGN PATENT DOCUMENTS

DE     10322794 A1   12/2004
DE     102014011383 A1  2/2016
DE     102017008970 A1  3/2019

OTHER PUBLICATIONS

PCT/DE2020/100626; International Search Report and Written Opinion of the International Searching Authority dated Sep. 30, 2020 and its English Translation.

*Primary Examiner* — Justin V Lewis
(74) *Attorney, Agent, or Firm* — Renner, Otto, Boisselle & Sklar, LLP

(57) ABSTRACT

The present invention relates to an article comprising fluorescence marker particles, wherein the fluorescence marker particles are distributed throughout the volume of the article or in a portion of the volume of the article and the fluorescence marker particles are present in a random distribution; the volume in which the fluorescence marker particles are distributed comprises a sub-volume; the sub-volume contains at least a portion of the fluorescence marker particles; the sub-volume is at least partially permeable to electromagnetic radiation having a wavelength in the visible range and/or in the near infrared range and/or in the UVA range; and/or a portion of the surface of the sub-volume is identical to a portion of the surface of the article; and a method of identifying it.

15 Claims, 3 Drawing Sheets

Figure 1A:
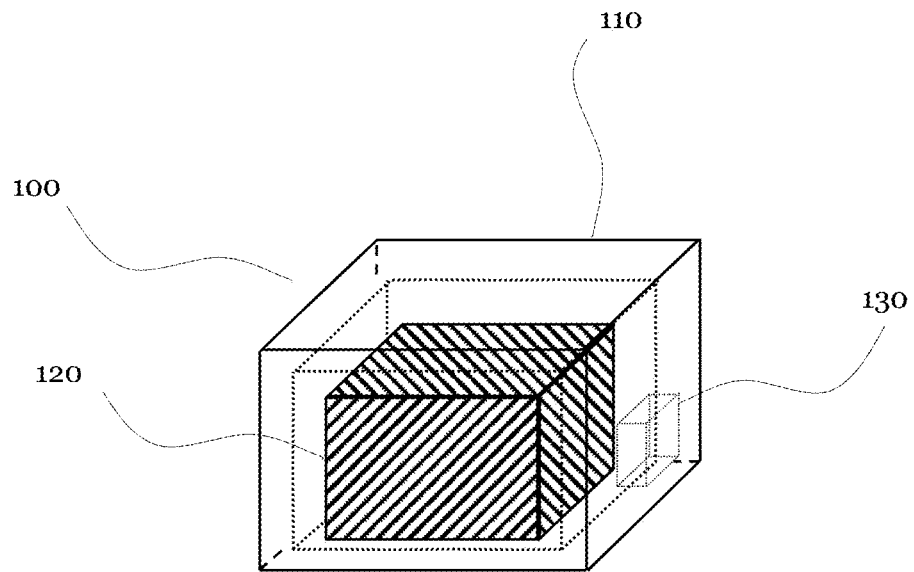

(51) Int. Cl.
 *B42D 25/351* (2014.01)
 *B42D 25/382* (2014.01)
 *B42D 25/387* (2014.01)

(52) U.S. Cl.
 CPC ......... *B42D 25/387* (2014.10); *G01N 21/643* (2013.01); *G01N 2021/6439* (2013.01)

(58) Field of Classification Search
 USPC ........ 283/67, 70, 72, 74, 88, 89, 90, 91, 92, 283/93, 94, 95, 98, 901
 See application file for complete search history.

(56) References Cited

U.S. PATENT DOCUMENTS

| | | |
|---|---|---|
| 2013/0214523 A1 | 8/2013 | Kecht et al. |
| 2016/0243876 A1* | 8/2016 | Kecht .................... B42D 15/00 |
| 2017/0044432 A1 | 2/2017 | Baque et al. |
| 2019/0184724 A1 | 6/2019 | Hook |

\* cited by examiner

ARTICLE COMPRISING FLUORESCENCE MARKER PARTICLES AND A METHOD OF IDENTIFYING THE SAME

This application is a national phase of International Application No. PCT/DE2020/100626 filed 16 Jul. 2020, which claims priority to Germany (Federal Republic of) Application No. 102019122010.6 filed 15 Aug. 2019, the entire disclosures of which are hereby incorporated by reference.

The present invention relates to an article comprising fluorescence marker particles and a method of identifying this article.

TECHNICAL BACKGROUND

From the production of a good via the logistics to the delivery to the customer and beyond, a successful product identification is essential. A variety of methods have become established here: in distant times, the engraving, which is reflected for example in the stonemasons of large old buildings, in the present time the proven label with barcode or matrix code (EAN or QR), and recently additionally electronic methods, such as for example the RFID chip. The identifiers 'engraving' and 'label' have in common that they are visually visible and therefore relatively easily copyable. Furthermore, they alter or cover the surface of the product to be designated. Although RFID chips can be attached hidden and invisible, the chips are relatively expensive, in particular if they are to be forgery-proof.

In many known publications, fluorescence markers are used for authenticating products, i.e. for authenticity control, such as for example in DE000010322794A1 for a sensor for the authenticity recognition of a luminescent security feature. In the case of the particle layer and the detection thereof, a planar and areal distribution is assumed here. Likewise, luminescent pigments are disclosed in DE102017004496A1, which are integrated into a printing ink in order to protect a printed product, such as for example a banknote, against forgery. In this case, the advantages of the fluorescence particles, such as their high luminescence intensity and their high chemical stability, are highlighted, which is also described in the patent specification DE1020144011383A.

It is therefore the object of the present invention to provide an article and a method for the identification thereof, which overcome the disadvantages of the prior art, in particular enable the unambiguous, forgery-proof identification of articles, without the optical appearance of the article being impaired.

DESCRIPTION OF THE INVENTION

This object is achieved by an article comprising fluorescence marker particles, wherein the fluorescence marker particles are distributed throughout the volume of the article or in a portion of the volume of the article and the fluorescence marker particles are present in a random distribution; the volume in which the fluorescence marker particles are distributed comprises a sub-volume; the sub-volume contains at least a portion of the fluorescence marker particles; the sub-volume is at least partially permeable to electromagnetic radiation having a wavelength in the visible range and/or in the near infrared range and/or in the UVA range; and a portion of the surface of the sub-volume is identical to a portion of the surface of the article.

Fluorescence marker particles in the sense of the present invention are in particular those fluorescence marker particles which are excitable in the near infrared range and/or in the UV range, preferably UVA, and are emitting in the visible range and/or in the (preferably) near infrared range. Reference is made here to the following excitation wavelengths: UVA (380-315 nm), NIR (IR-A 780 nm-1,400 nm, preferably 980 nm), visible light VIS (380-780 nm), UV (380-100 nm) and IR (780 nm-1 mm). The use of such fluorescence marker particles enables detection with a commercially available camera, whereby the emission can be detected without particular effort both in the VIS and in the NIR range. Suitable particles are well known to the person skilled in the art, for instance from the documents WO 2017/220079 A1 or DE 10 2014 105 846 A1.

The fluorescence marker particles are distributed either throughout the whole volume of the article or merely in a portion of the volume of the article. They are present in this total or partial volume in a random distribution. According to the invention, it is provided that the total or partial volume in which the fluorescence marker particles are present comprises a sub-volume. The sub-volume here is a delimitable portion of the volume in which the fluorescence marker particles are distributed. Also in this sub-volume, the fluorescence marker particles are present in a random distribution. The random spatial particle distribution in the sub-volume enables an unambiguous identification of the article. Details of this unambiguous identification are described in the further text in connection with the method according to the invention.

It can be provided that the fluorescence marker particles are uniformly distributed in the volume or the portion of the volume of the article. In this sense, uniformly does not mean that the particles are regularly arranged. Rather, it can be provided that approximately the same quantity of particles is present in the same volume unit. Within this determined volume unit, the arrangement of the particles is then random.

In one embodiment, it can be provided that the fluorescence marker particles are excitable in the near infrared range and/or in the UVA range and are emitting in the visible range and/or in the near infrared range.

In a further embodiment, it can be provided that the fluorescence marker particles comprise at least two different types of fluorescence marker particles which differ from each other in terms of their size and/or shape and/or chemical composition. In this context, it can be provided that the chemical composition correlates with the fluorescence emission.

According to one embodiment, it can be provided that the article comprises a good and/or a casing, the casing at least partially enclosing the good. In this context, it can be provided that the casing at least partially encloses the good and the fluorescence marker particles are distributed in the good and/or the casing or a portion of the good and/or the casing. According to the invention, it can also be expressly provided that the article of the present invention is a casing, for instance a packaging material, a crate, etc., into which a good which does not belong to the article can be introduced. According to the invention, it can likewise be provided that the article comprises a combination of casing and good. Alternatively, it can be provided that the article is the good itself.

In one embodiment, it can be provided that the fluorescence marker particles are distributed in the casing or a portion thereof and the sub-volume is a portion of the volume of the casing.

In a further embodiment, it can be provided that the fluorescence marker particles have an average diameter in the range from 0.1 µm to 500 µm, preferably 2 µm to 200 µM, particularly preferably 20 µm to 50 µm.

In a further embodiment, it can be provided that particles of different size are used. For example, it can be provided that the following average diameters can be provided for the different particles: 25 µm, 32 µm, 45 µm, 63 µm, 75 µm, 90 µm, 150 µm and 250 µm. The individual particles of the respective fractions can be separated by a simple and cost-effective screening method. Alternatively, it can be provided that already suitable particles of different size are synthesised. Finally, the appropriate particle size is dependent on the area of the identification access region and the pixel resolution of the camera system. The smaller particle sizes are suitable for applications such as films, laminates or blister packs, furthermore for electronic components such as light-emitting diodes for LED chip binning control etc. the larger sizes for housings and containers etc. As the simplest and most cost-effective exemplary embodiment, the use of a 0.1 MPixel camera (320×240 pixels, so-called QVGA—currently smallest commercially available camera chip format) would be conceivable (larger formats would be e.g. VGA, SVGA, XGA, etc.). As a rule of thumb, unambiguously detecting an idealised particle with 3×3 camera pixels and a 2-pixel edge, the particle image object width of 7 pixels results. Applied to the (smaller) camera image height, 34 particles can be strung together and, converted to an identification window of 2×2 mm, a particle size of 60 µm thereby results. Starting from this example, larger identification windows can be defined, which can later be found reliably in the application or can be approached in a positionally accurate manner to a camera. Likewise, conversely, the required camera resolution can be calculated via a fixed minimum particle size and a predetermined identification fender.

In a further embodiment, it can be provided that the fluorescence marker particles are suitable to emit at least two different emission lines in the visible range and/or in the near infrared range after excitation with an infrared source. The emission lines can in this context be single spectral colours or emission wavelength ranges. Preferably, fluorescence marker particles are provided in this context, which emit at approximately 470 nm, 550 nm, 670 nm (vis) and 800 nm (NIR), respectively ±20 nm.

According to a further embodiment, it can be provided that the fluorescence marker particles are arranged in the sub-volume in at least two different planes. An arrangement of the fluorescence marker particles in at least two different planes of the sub-volume can be achieved for example by stacking, lamination, 2K injection molding and other methods known from the prior art.

In an embodiment, it can be provided that the sub-volume is optically indistinguishable from at least a portion of the remaining article. In this context, "optically indistinguishable" means that the surface, colour and/or material properties are the same and/or the optical refractive index of the materials is the same or differs by no more than ±15%.

In a further embodiment, it can be provided that the sub-volume has a thickness of 0.5 µm to 500 µm, alternatively 0.5 mm to 5 mm. According to the invention, it is provided that the sub-volume is arranged on the surface of the article, i.e. that a portion of the surface of the sub-volume with a portion of the surface of the sub-volume is identical to a portion of the surface of the article. The thickness of the sub-volume according to the preceding embodiment is measured starting from this common surface towards the center point of the article. A thickness range of 0.5 µm to 500 µm in this context is provided for instance when the article is a film, a tape, an adhesive layer etc. A thickness of 0.5 mm to 5 mm can be provided in particular when the article is a housing, a diaphragm, an insert, a container, a carrier, a product, a good, etc.

In an embodiment, it can be provided that the sub-volume is transparent, translucent or dyed with a dye. In this context, the term "transparency" refers to a surface which is smooth and has a low surface roughness (e.g. PPMA or PC crystal-clear). "Translucent" means "milkily" scattering, either by integrated scattering particles or via the surface roughness (e.g. milk glass). "Dyed" in this context means that a dye is added to the sub-volume, for instance a glass with chemical additives.

In a further embodiment, it can be provided that the article further comprises markings which are arranged relative to the sub-volume. With respect to the markings, it can be provided that the markings are attached to the article by printing and/or surface contour elevation or indentation. This serves to adjust a detection device for particle detection, i.e. to determine the relative arrangement of the fluorescence marker particles arranged in the sub-volume. The marking can in particular comprise at least one reference point which allows the article to be positioned such that the emission, and consequently the position, of the fluorescence marker particles can be determined by means of a suitable detection device.

In a further embodiment, it can be provided that the volume ratio of average-particle-volume:sub-volume is at least 1:20. In this context, "at least" means that the volume ratio can shift in favour of the sub-volume (for example 1:25, 1:30 etc.). The following thought model serves as an example for the determination of the volume ratio: a 'particle' which consists in an idealised manner of 9 (3×3 stacked) imaginary stone cubes is integrated centrally into a volume of 7×7×3 imaginary glass cubes. The arrangement is designed for a 1-to-1-pixel cube identification with a camera which detects the 9 particle cubes and the respectively surrounding two rows of glass cubes perpendicular to the 7×7 glass cube surface. As a result of this model, a minimum volume ratio of approx. 9:147=1:17 results. The usual volume ratios can be reduced up to ten to single-digit ppm values, so that statistically only one particle is present in the sub-volume. In practice, of course, a statistically sensible, intermediate ratio is set. The actual aim of the ratio number is the sufficient separation of the particles for the later identification and the avoidance of the particle superimposition, as well as, in the case of variation of the ratio number, the achievement of the largest possible distinguishable particle arrangement probability, from which the variant scope of the FMCC (fluorescence marker characterization code) is then derived.

According to one embodiment, it can be provided that the outer contour of the sub-volume is quadrangular, square, round or three-dimensionally free-form.

In a further embodiment, it can be provided that the good and the casing are connected to one another.

According to a further embodiment, it can be provided that the casing cannot be separated from the good without destruction.

In a further embodiment, it can be provided that the casing is detachable from the good. In such an embodiment, the article is for instance a packaging, a container, a carrier, a box etc.

According to a further embodiment, it can be provided that the casing only partially encloses the good. In such an embodiment, the article is for instance a packaging tape, a diaphragm, an insert etc.

In a further embodiment, it can be provided that both the casing and the sub-volume are transparent. In this context, transparent means that the optical refractive index of the materials is preferably the same or differs by no more than ±15%.

The object is further achieved by a method of identifying an article comprising the steps of: a) providing an article according to the invention; b) determining the random spatial distribution of the fluorescence marker particles in the sub-volume; and c) matching the determined random spatial distribution with stored information on the random spatial arrangement for identification of the article.

According to an embodiment, it can be provided that determining the random spatial distribution of the fluorescence marker particles in the sub-volume comprises opto-sensorily detecting an emission of the fluorescence marker particles.

In a further embodiment, it can be provided that the matching in step c) comprises converting the determined random spatial distribution of the fluorescence marker particles into a mathematical code characteristic of the distribution.

According to a further embodiment, it can be provided that in addition to the random spatial distribution, the size and/or the shape and/or the chemical composition of the fluorescence marker particles is determined, and the information thus obtained is matched with a corresponding stored information. In this context, it is provided that the chemical composition correlates with the fluorescence emission.

In a further embodiment, it can be provided that the determining in step b) comprises the evaluating of at least one emission line. The emission lines can thereby be single spectral colours or emission wavelength ranges. The markers emit, for example, preferably at approximately 470 nm, 550 nm, 670 nm (VIS) and 800 nm (NIR), respectively ±20 nm.

In a further embodiment, it can be provided that in addition to the random spatial distribution, an emission decay time of individual particles after a deactivation is determined by an excitation.

In a further embodiment, it can be provided that an emission decay time of individual particles upon activation of the excitation is determined for the random spatial distribution.

In a further embodiment, it can be provided that in addition to the random spatial distribution, an emission intensity of individual particles upon activation of an excitation is determined.

According to a further embodiment, it can be provided that the determining in step b) comprises the use of a camera, a line camera or a smartphone camera. The particle positions, in particular the position depth transverse to the identification surface, can thereby be detected with the aid of known methods: for example by a stereo objective, a stereo camera, by means of depth of field, by means of triangulational methods, by movement of the camera longitudinally or inclined to the identification window or with a time of flight camera (ToF). The smartphone camera can also be an attachment (in particular with respect to the particle excitation) for the smartphone camera.

Finally, according to an embodiment, it can be provided that the matching in step c) comprises the matching with a mathematical characterization code of the fluorescence marker particles, which is stored in a memory database or cloud.

The article marked according to the invention and the identification of the same with the method according to the invention makes it possible to overcome disadvantages of the prior art and in particular to achieve the following technical advantages.

a) Integration of the fluorescence marker particles (FMP) within the framework of already required standard production methods is possible, so that no additional production step and no additional component is required for the attachment of the identification means.

b) Invisible integration of the identification feature without influencing the surface or the design of the article, the good or the product is possible, due to the small particle size and the small white-diffuse daylight emission characteristic.

c) Exorbitant number of coding possibilities and codes for an extensive product range and large number of products is possible: due to the position of the particles, due to the variation of the particle sizes, due to different particle colour emissions, due to different particle geometries. The limitation is provided merely by the window size and the camera resolution.

d) Identification feature with maximum copy protection and therefore maximum forgery protection, since, in contrast to printed barcodes, QR codes and the like, it is practically impossible to copy the random two- and three-dimensional position as well as the properties of the fluorescence marker particles.

e) Identification feature with additional forgery protection, since the feature (e.g. the position of the pattern) and the identification method (e.g. which characteristic or information of the particles are evaluated, how the mathematical model is constructed) are not known to the counterfeiter.

f) Identification feature in which the identification window (=sub-volume) can be visible so that the finding of the detection range with the detection device is simple.

g) Identification feature in which the identification window (=sub-volume) can be invisible and can be varied so that the copying or counterfeiting is made considerably more difficult.

h) Particularly high-contrast particle pattern and therefore identification feature, since, when using "up-conversion" FMP and excitation in the NIR, no other optical signals are generated in the VIS than the up-conversion fluorescence of the FMP and all both synthetic and natural production materials show no or no relevant up-conversion fluorescence. Each Stokes fluorescence is therefore far worse with respect to the contrast of the particle pattern than the patent-related use of up-conversion FMP.

i) In addition, the use of "up-conversion" FMP by the high contrast of the particle pattern makes it possible that the particle patterns can be measured and detected even in the case of damaged or scratched detection range surfaces.

j) Furthermore, the particle size can be adapted to the product or article size. The same applies to the sub-volume As a result, the method according to the invention results in the following general advantages:

a) Simple and cost-effective identification marking for articles, goods or products
b) Unambiguous and unique identification technology
c) Can be read out quickly and conveniently
d) Favourable control and evaluation technology

DETAILED DESCRIPTION OF THE INVENTION

In the following, the invention shall be described with reference to concrete embodiments and the drawings, without features mentioned in this context necessarily being considered essential for the invention. Rather, individual features can be combined together with the above-mentioned general features. The following description serves in particular to explain the invention on the basis of concrete embodiments.

Figure 3:
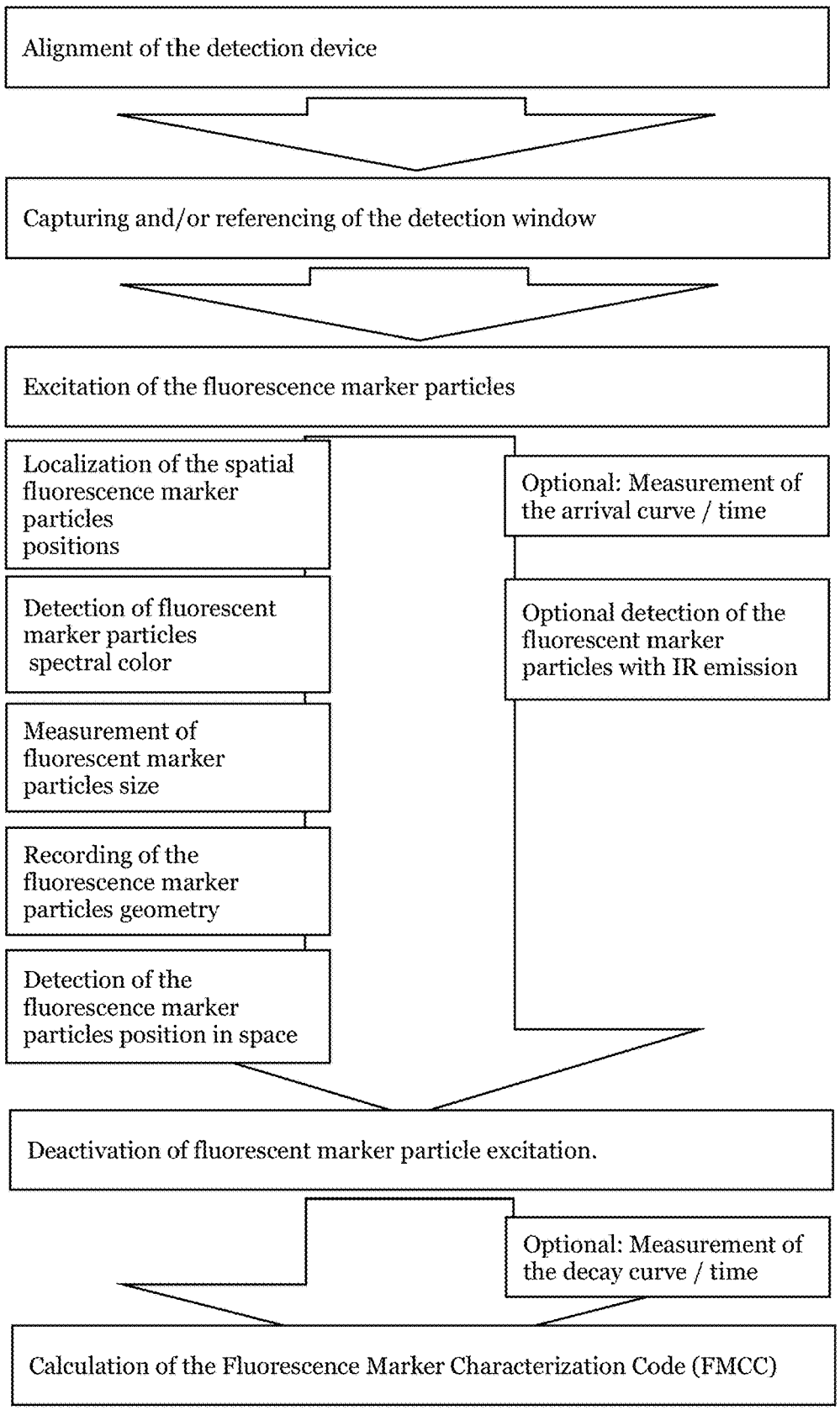

FIG. 1: Schematic spatial representation of an article according to the invention comprising fluorescence marker particles FIG. 2: Schematic representation of a device for carrying out the method according to the invention for identification of the article shown in FIG. 1;

FIG. 3: Flow diagram for the schematic sequence of the method according to the invention in a preferred embodiment.

Fluorescence is a common technology for shifting the wavelength of an emission source from the edge region of the visible spectrum or even outside this region into the 'see zone' (approx. 380 nm-780 nm) within the so-called light sensitivity curve V(λ). By means of suitable fluorescent colour pigments, both Stokes shifts, in which the back-emitted emission wavelength is radiated in a stretched manner with respect to the excitation wavelength by means of "down-shift" and the anti-Stokes shift is emitted by means of "up-converting" the emission wavelength is emitted in a compressed manner, can be realised.

For the present invention, both directions are conceivable: i.e. an excitation of "down-shift"—FMP (fluorescence marker particles) with a UV LED or a UV laser or the excitation of "up-converting" FMP with an IR light-emitting diode or an infrared laser. The "up-converting" is preferred here, since this effect can be better detected due to its "unnaturalness" (to emit energetically higher wavelengths with respect to the excitation wavelength). In addition, a completely invisible detection manner can thus be implemented, by using suitable FMP, which are excited both in the near infrared spectral range (NIR) and emit in the NIR range (e.g. excitation at approximately 980 nm and emission at 800 nm). By suitable doping of the fluorescence material, any desired emission colours (in the visible spectral range VIS) can be generated. Upon excitation with 980 nm, particles with individual or different emission ranges can thus be distinguished, for example, with the peak wavelength of 480 nm 546 nm, 607 nm and 758 nm.

With a commercially available camera, it is possible to detect these emissions without particular effort both in the VIS but also in the NIR range. Further information on the FMP can be obtained, in addition to general publications, inter alia from WO 2017/220079 A1, DE 10 2014 105 846 A1.

The FM particles are usually present after the wet and dry-chemical synthesis in the sizes of somewhat less than 1 μm up to particles and also particle agglomerates up to several hundred micrometers. By grinding processes and screening, the required particle sizes can be separated.

With the selected particles, finally, the product, article or product coating can be filled by commercially available and known processes, for example by FMP compounding of the coating material with the aid of an extruder or by means of multilayer stacking of films with FMP-filled adhesive layers, furthermore by 3D printing with FMP-filled filaments. The coating is in this case transparent or translucent (opaque or milkily transparent) both for UV via the visible (VIS) up to the near infrared spectral range (NIR), in order to enable both the excitation of the FMP and also the opto-sensorily evaluation. The coating can be a film (provided that the material thickness is selected to be greater than the particle size), preferably it is a blister pack. Furthermore, a transparent housing or a box or another container is conceivable.

A corresponding embodiment is shown in FIG. 1. In this embodiment, the article 100 comprises a casing no as well as a good 120. The good 120 is completely enclosed by the casing 110. In the embodiment shown, the article 100, more precisely the casing 120, comprises a sub-volume 130 which represents a portion of the volume of the casing 120 and thus of the article 100. In the article 100, fluorescence marker particles (not shown) are distributed in a random arrangement. At least a portion of the particles here is present in the sub-volume 130 in a random arrangement.

Figure 1B:
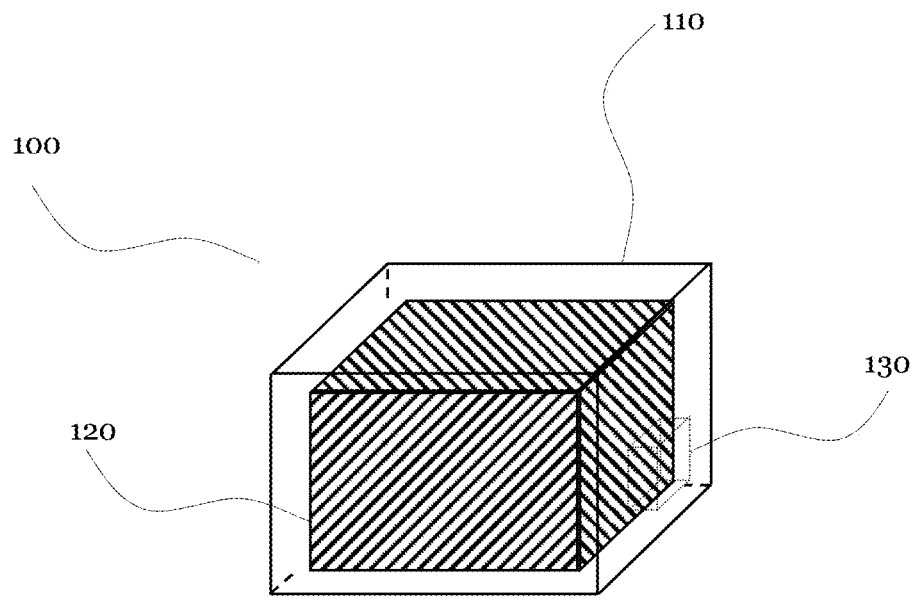

The described casing can be connected to the good firmly and not detachably without destruction, for example by adhesive bonding, a 2K injection-molding process or lamination or a 3D printing process. A respective example is shown in FIG. 1B.

Furthermore, the casing can completely but also partially surround the good, for example a strapping band for the goods fixing on a pallet. Last but not least, it is also conceivable that the casing is almost limited to the sub-volume.

The sub-volume can have the following properties: it is distinguished by the fact that a spatial evaluation of the fluorescent marker particles randomly arranged in a volume-like manner takes place merely in this surface-casing region and the region, or the volume lying behind it, is either visible or invisible, i.e. not highlighted, worked out. A visible formation would be, for example, a frame printing or a targeted casing surface change in the detection region, e.g. a groove, an elevation or trough, furthermore a colouring of the volume-like window itself. In the case of the 'invisible' formation, the sub-volume cannot be distinguished from the surrounding casing region. The actual sub-volume is only limited by the positioning of the detection device and is therefore only 'known' to the detecting person, or the detection device. Here, existing edges, contours, positioning aids and/or, in addition to these mechanical elements, optical properties of the article close to, or at a distance from, the sub-volume can serve as a reference for positioning alignment.

Figure 2:
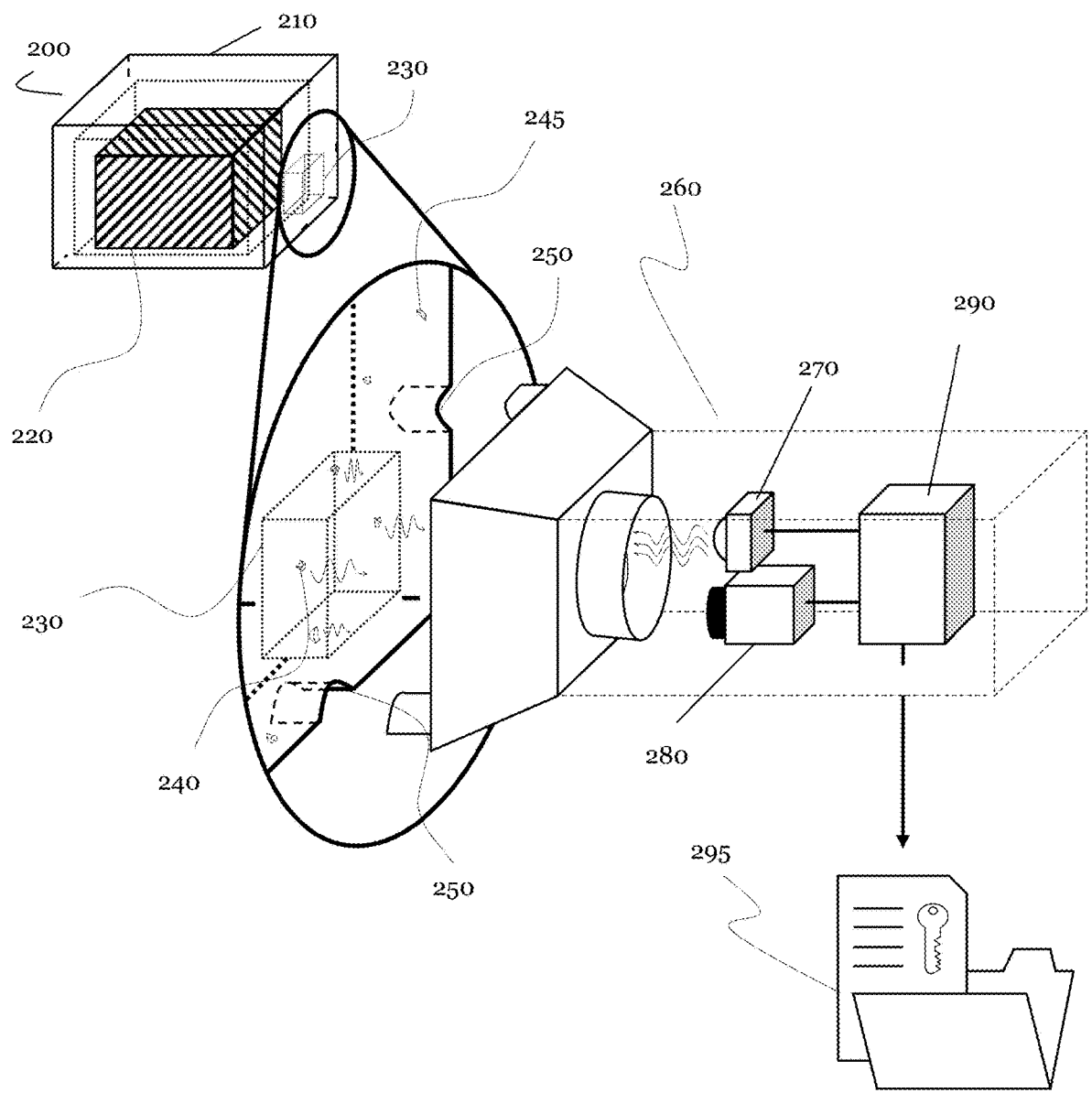

A device for carrying out the method according to the invention is shown in FIG. 2. An article 200 comprising a casing 210 and a good 220 is to be identified, wherein, in accordance with FIG. 1, fluorescence marker particles 240/245 are present in a random arrangement in a sub-volume 230 and, where applicable, in the remaining volume of the article 200. The article 200 shown in FIG. 2 further has markings 250 in the form of notches which enable the article 200 to be arranged such that the fluorescence marker particles 240 contained in the sub-volume 230 can be detected by means of the detection device 260. The detection device 260 serves to determine the random spatial distribution of the fluorescence marker particles 240 in the sub-volume 230 and contains an excitation source 270, a camera 280 and a control and evaluation unit 290. After the determination of the random spatial distribution of the fluorescence marker particles 240 in the sub-volume 230, the generation of the mathematical FMCC 295 for matching with stored data takes place with the aid of the evaluation unit 290 in order to identify the article 200.

In a particular embodiment, this method can be carried out as follows. First, the detection device is aligned with the casing over the sub-volume with the aid of positioning springs. The sub-volume can be designed to be visible or invisible for this purpose. The diaphragm of the detection device keeps away unintended extraneous light. In the sub-volume, EMP (emission particles) are irradiated by the excitation source in the detection device and evaluated by a camera (in each case controlled by the control and evaluation device). The camera, which can be a matrix-based CCD, CMOS, ToF, dual or a line camera, detects the three-dimensional position of the FM particles with the aid of known methods, such as depth of field variation, a triangulational measurement e.g. with a transversely varying camera or by means of dual camera. In addition, the camera detects the emission colour (or the emission colour range) of the particles, the size, the contour, and the spatial position or alignment in space.

With the control and evaluation device, the measured data are recorded and converted into an unambiguous fluorescence marker characterization code (FMCC) with a mathematical algorithm, which is not to be explained further here. The FMCC is intended to completely describe the particle constellation and at the same time to be fault-tolerant with respect to mechanical influences, such as e.g. wear of the casing surface, by the variation and cubic data abundance enabled with the method.

A complete possible measurement sequence of the method is described in FIG. 3. As already explained, the detection unit is aligned in the first step. Thereafter, the sub-volume is referenced. Either by image processing technology, by optically detectable markings or by mechanical reference points. In the case of the optical detection by image processing technology, it is expedient additionally to make use of an illumination in the visible emission spectrum (which was not explicitly stated in sketch 2). After excitation of the EMP with infrared or/and ultraviolet light, the localization of the spatial EMP positions, detection of the particle spectral colour, measurement of the EMP size and geometry and the detection of the EMP position in space are carried out. Optionally, it is possible, when switching on the excitation source, likewise to evaluate the light-technical illumination behaviour of the EMP. Likewise, after the deactivation of the excitation source, the light-technical decay behaviour can be detected. These temporally exponentially running luminous properties of the fluorescence marker particles during and after excitation are settable in a targeted manner by corresponding doping of the EMP and can likewise be concomitantly included for the calculation of the FMCC.

Finally, by means of the FMCC, the product assignment, product tracking and data processing and storage can be carried out with the customary technologies.

The features disclosed in the above description, in the claims and in the drawings can be essential both individually and in any desired combination for the realization of the invention in its various embodiments.

The invention claimed is:

1. An article comprising fluorescence marker particles, wherein
   the fluorescence marker particles are distributed throughout a volume of the article or in a portion of the volume of the article and the fluorescence marker particles are present in a random distribution;
   the volume in which the fluorescence marker particles are distributed comprises a sub-volume;
   the sub-volume contains at least a portion of the fluorescence marker particles;
   the sub-volume is at least partially transmissive to electromagnetic radiation having a wavelength in a visible range and/or in a near infrared range and/or in a UVA range; and
   a portion of a surface of the sub-volume is identical to a portion of the surface of the article;
   wherein the article comprises a good, a casing, or both a good and a casing;
   and both the casing, when present, and the sub-volume are transparent.

2. The article of claim 1, wherein the fluorescence marker particles comprise at least two different types of fluorescence marker particles that differ from each other in size and/or shape and/or chemical composition.

3. The article of claim 2, wherein the fluorescence marker particles are adapted to emit at least two different emission lines in the visible range and/or in the near infrared range after excitation with an infrared source.

4. The article of claim 2, wherein the sub-volume is optically indistinguishable from at least a portion of a remaining portion of the article.

5. The article of claim 2, wherein the sub-volume is transparent, translucent or dyed with a dye.

6. The article of claim 2, wherein the article comprises a good and a casing, wherein the casing at least partially encloses the good.

7. The article of claim 1, wherein the fluorescence marker particles are adapted to emit at least two different emission lines in the visible range and/or in the near infrared range after excitation with an infrared source.

8. The article of claim 1, wherein the sub-volume is optically indistinguishable from at least a portion of a remaining portion of the article.

9. The article of claim 1, wherein the sub-volume is transparent, translucent or dyed with a dye.

10. A method of identifying an article comprising the steps of:
    a) providing an article according to claim 1;
    b) determining the random spatial distribution of the fluorescence marker particles in the sub-volume; and
    c) matching the determined random spatial distribution with stored information on the random spatial arrangement for identification of the article.

11. The method of claim 10, wherein determining the random spatial distribution of the fluorescence marker particles in the sub-volume comprises opto-sensorily detecting an emission of the fluorescence marker particles.

12. The method of claim 10, wherein the matching in step c) comprises converting the determined random spatial distribution of the fluorescence marker particles into a mathematical code.

13. The article of claim 1, wherein the article comprises a good and a casing, wherein the casing at least partially encloses the good.

14. An article comprising fluorescence marker particles, wherein
    the fluorescence marker particles are distributed throughout the volume of the article or in a portion of the volume of the article and the fluorescence marker particles are present in a random distribution;
    the volume in which the fluorescence marker particles are distributed comprises a sub-volume;
    the sub-volume contains at least a portion of the fluorescence marker particles;
    the sub-volume is at least partially transmissive to electromagnetic radiation having a wavelength in the visible range and/or in the near infrared range and/or in the UVA range; and
    a portion of the surface of the sub-volume is identical to a portion of the surface of the article;

wherein the sub-volume is transparent, translucent or dyed with a dye.

15. A method of identifying an article comprising the steps of:
a) providing an article, the article comprising fluorescence marker particles, wherein
   the fluorescence marker particles are distributed throughout the volume of the article or in a portion of the volume of the article and the fluorescence marker particles are present in a random distribution;
   the volume in which the fluorescence marker particles are distributed comprises a sub-volume;
   the sub-volume contains at least a portion of the fluorescence marker particles;
   the sub-volume is at least partially transmissive to electromagnetic radiation having a wavelength in the visible range and/or in the near infrared range and/or in the UVA range; and
   a portion of the surface of the sub-volume is identical to a portion of the surface of the article;
b) determining the random spatial distribution of the fluorescence marker particles in the sub-volume; and
c) matching the determined random spatial distribution with stored information on the random spatial arrangement for identification of the article.

* * * * *